L. A. YOUNG.
SEAT BACK SPRING.
APPLICATION FILED JULY 16, 1915.

1,186,261.

Patented June 6, 1916.
2 SHEETS—SHEET 1.

Witness

INVENTOR
Leonard A. Young
BY
Palgemond A. Parker
ATTORNEY

L. A. YOUNG.
SEAT BACK SPRING.
APPLICATION FILED JULY 16, 1915.

1,186,261.

Patented June 6, 1916.
2 SHEETS—SHEET 2.

INVENTOR
Leonard A. Young
BY
Raymond A. Parker
ATTORNEY

Witness.
Robert N. Van B...

UNITED STATES PATENT OFFICE.

LEONARD A. YOUNG, OF DETROIT, MICHIGAN.

SEAT-BACK SPRING.

1,186,261.       Specification of Letters Patent.      Patented June 6, 1916.

Application filed July 16, 1915. Serial No. 40,160.

*To all whom it may concern:*

Be it known that I, LEONARD A. YOUNG, who am a citizen of the United States, residing at Detroit, county of Wayne, State of Michigan, have invented a certain new and useful Improvement in Seat-Back Springs, and declare the following to be a full, clear, and exact description of the same, such as will enable others skilled in the art to which it pertains to make and use the same, reference being had to the accompanying drawings, which form a part of this specification.

This invention relates to seat back springs and more especially the seat back springs designed for use in automobiles.

It comprises a seat back spring provided with an edge spring structure made up of arches which are mounted so as to pivot with respect to the rest of the spring structure. This relieves the rest of the spring structure from strains and distortions.

A further feature is the use of a two-part arch in this edge spring structure, the two parts of which are connected by a hinge-joint so that they can pivot with respect to each other.

Figure 5:
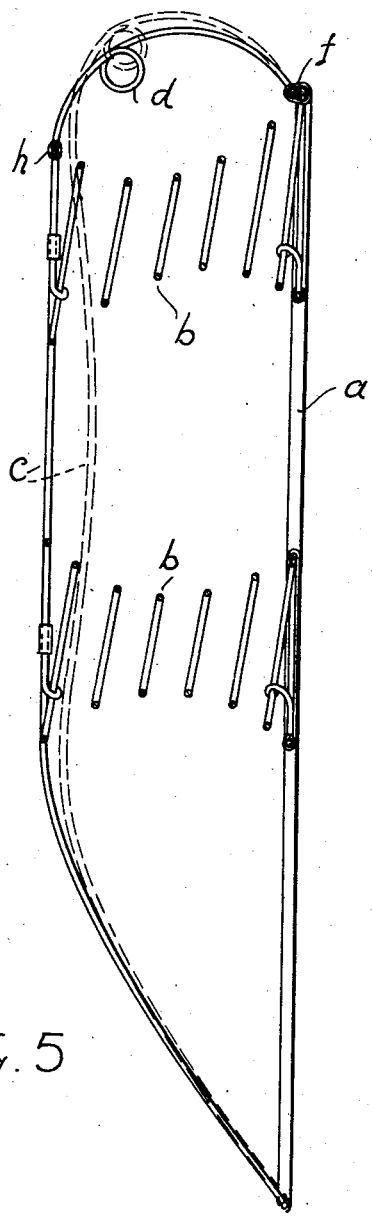
Figure 1:
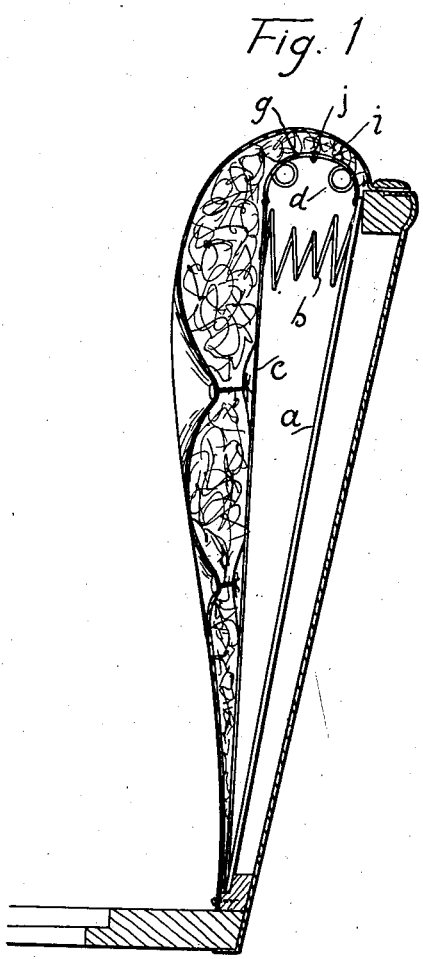
Figure 3:
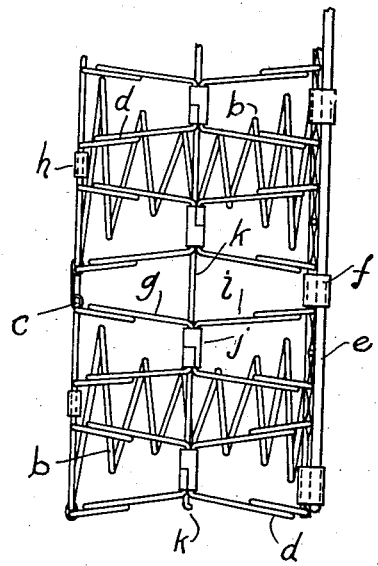
Figure 4:
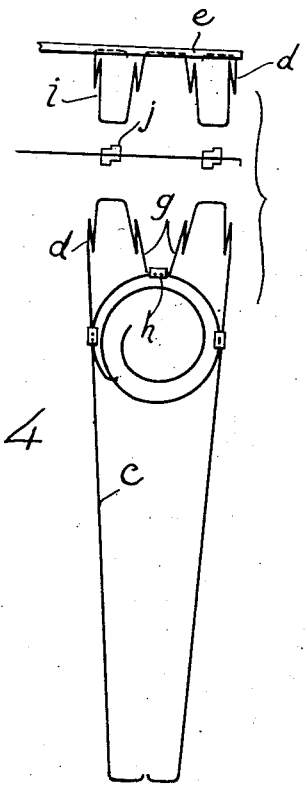
Figure 2:
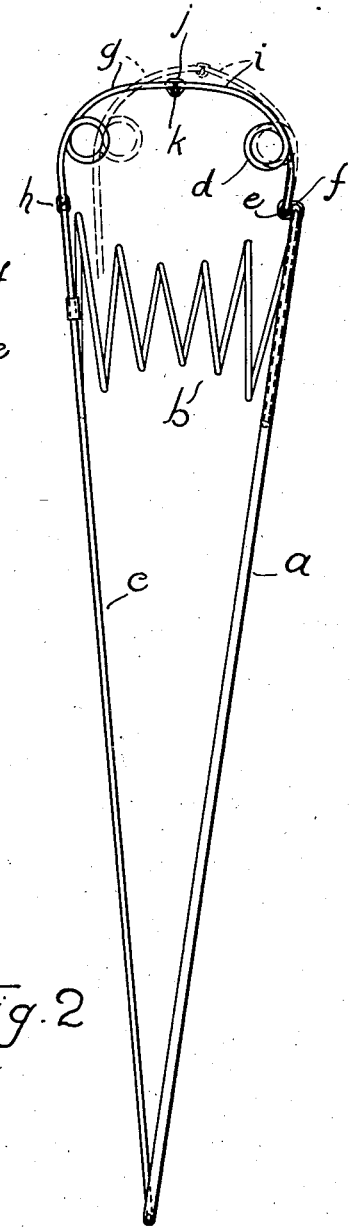

In the drawings,—Figure 1, is a vertical section through the seat back showing the spring in place and the upholstering. Fig. 2, is an end view of the seat back spring showing the action of the arch in dotted lines. Fig. 3, is a portion of a top or plan view of the seat back spring. Fig. 4, is a diagrammatic view showing how the parts are assembled. Fig. 5, is a vertical section of a modified form of seat back spring.

The seat back spring comprises a suitable base frame $a$ for carrying the helical springs $b$, of which there may be one or more horizontal rows. The face or front structure of the seat back spring is preferably made up of the upright parts of wire units, one of which is shown in Fig. 4 and designated $c$. This comprises a single piece of wire bent to the shape of a crude elongated heart. At the top, the sides and indenture really form arms of the arches each of which is provided with a convolution $d$. These convolutions make the arches yieldable. The arches are intended to support the upholstering in the manner shown in Fig. 1, although it is of course obvious that the arch may be more or less above or below the trimming rail, depending upon the style of upholstery adopted. The rear ends of the arches are pinched into the channel bar $e$. The base-frame, or back, of the seat spring is in reality made up of a plurality of channel bars, the border bar of which is indicated as $a$ in Fig. 5. I connect the top bar of the base-frame $a$ with the channel bar $e$ by means of the clips $f$. These clips $f$ are really small bands which allow the channel bar to turn therein; hence the ends of the arches in both the form shown in Figs. 1, 2, 3, 4 and the form shown in Fig. 5 are hinged, as are also the inside pair of convoluted arms $g$ of each unit at their forward ends. These two arms $g$ (Fig. 4) are connected to the top coil of the helical spring by a clip $h$.

In the form of spring shown in Fig. 5, the wire which forms the unit $c$ extends completely over the top of the seat back spring to form the arch. In the form shown in Fig. 4, the wire unit $c$ extends only half way over the arch and the second element $i$ is used. This will be termed the "half-arch" element and comprises a single piece of wire bent to form four convoluted arches, the rear ends of the arms being crimped into the channel bars $e$. Now the four arms of this half-arch element are paired together at the forward end by two short runs of wire; similarly the four convoluted arms of the wire unit $c$ are paired together at their upper ends in two pairs by short runs of the wire. These short runs of the wire unit $c$ and the half-arch element $i$ are hinged together by the clips $j$ which also inclose and hold the connecting wire or rod $k$. This connecting rod is important for two of its functions: it serves to prevent the upholstery from dropping down between the arches, which is important because, if the upholstery does this, it will not only sag, but will get down in between the arches and interfere with their action; its second function is the transfer of some of the stresses brought on one set of arches to adjoining arches so they will aid in resisting the stresses and one arch will not be too greatly collapsed.

The type of seat-back spring represented by the two modified forms shown in my drawings, that is to say, the seat back spring which is provided with an edge spring structure at the top to do away with the large amount of curled hair packing has only been in use for something like five years; in that time it has been found that the arches which form each spring structure are subjected to unusual strains.

In many of the upholstering jobs upon which this general type of seat-back spring has been employed, it has been found that the arches actually snap under the strain and very often the broken ends protrude through the upholstering cover, requiring the removal of the cover and the replacement of the broken arches, or else the whole seat back spring. It is to obviate this difficulty that the present invention was developed. The difficulty is obviated by the hinging of the arches, as already alluded to. This hinging of the arches allows the spring structure to assume the position shown in dotted lines in Figs. 2 and 5, when the springs are subjected to strain by the occupant of the seat leaning against the face of the seat-back spring. This is especially true with the form shown in Fig. 2 wherein the wire, instead of being repeatedly subjected to a double strain, simply hinges on the center pivot of the arch. This doubling strain is hence practically eliminated. It is this doubling strain that snaps the arches, as anyone is aware that wire may be easily broken by a continual doubling. In the form of arch shown in Fig. 4, this doubling strain is also relieved, for as already indicated, the rear ends of the arches are hinged to the base structure and the inside pair of each set of four arches is hinged to the helical spring. There is only one convolution in each arch and this convolution is placed at such a point (which is practically the center of the arch) that the doubling strain incident to pressure against the face of the seat-back spring comes at the convolution of the arch, which is better adapted to resist it.

What I claim is:

1. A seat back spring, having in combination a base-frame, a front structure, helical springs spacing the front structure from the base-frame, and a plurality of arches connecting the front structure and the base-frame at the top, each arch made up of two parts which are hinged together at the top of the arch.

2. A seat back spring, having in combination a base-frame, a front structure, helical springs connecting the two together, and a plurality of two-part arches connecting the front structure and the base-frame at the top, said arched parts arranged in pairs, each pair comprising two convolute arms connected by a short run of wire, the two runs of wire of opposed pairs of arch parts being connected by a clip whereby the two parts of an arch are hinged together at the top.

3. A seat back spring, having in combination a base-frame, a front structure, helical springs spacing the said two elements, arch springs connecting the front structure with the base-frame at the top, each arch comprising two parts hinged together at the center, and a cross rod connecting the said arches together along their hinging line.

4. A seat-back spring, having in combination a base-frame, a front structure, helical springs spacing the same, a plurality of arches connecting the base-frame and the front structure at the top, a channel bar into which the rear ends of the arches are clamped, and clips banded around the upper member of the base-frame and the channel bar to hingedly connect the arches with the base-frame.

5. A seat back spring, having in combination, a base-frame, a front structure, helical springs spacing the same, and a plurality of two-part arches connecting the base-frame with the front structure at the top, the parts of the said arches being hinged together at the top and each a convolute spring.

6. A seat back spring, having in combination a base-frame, a front structure, helical springs spacing the same, and arches connecting the base-frame with the front structure at the top and comprising a plurality of U-like members arranged to have their U-bases abut at the top of the arch, and clips for hingedly connecting the bases of the U together.

7. A seat back spring, having in combination, a base-frame, a front structure, helical springs spacing the same, a plurality of two-part arches connecting the front frame and the base-frame at the top and comprising a plurality of U-like arch parts, opposite U's being arranged to have the bases of the U's abut at the top of the arch, a cross bar extending along the top of the arches transversely thereof, and clips for banding together the bases of opposed U-arch parts, together with the cross bar.

8. A seat back spring, having in combination, a base frame, a front structure, helical springs connecting the same together, and a plurality of two-part arches connecting the front structure and the base frame at the top, said arch parts arranged in pairs, each pair comprising two spring arms connected by a short run of wire, the two runs of wire of opposed pairs of arch parts being connected by a clip whereby the two parts of an arch are hinged together at the top.

9. A seat back spring, having in combination, a base frame, a front structure, helical springs spacing the front structure from the base frame, a plurality of arches connecting the front structure and the base frame at the top, each arch made up of two parts which are hinged together at the top of the arch, and transverse connections between the said plurality of arches.

10. A seat back spring, having in combination, a base frame, a front structure, helical springs spacing the front structure from the base frame, a plurality of arches connecting the front structure and the base frame at the top, each arch made up of two parts which are hinged together at the top of the arch, and a stiff cross connection running along the plurality of arches and connecting the same together.

11. A seat back spring, having in combination, a base frame, a front structure, and an arch spring structure, the front structure and the forward part of the arch spring structure being made up of wire units which comprise wires extending from the bottom of the base frame up over the helical springs arching and twice looped at the top to form the forward part of the arch spring structure, thence returning down over the helical springs to the bottom of the base frame to complete a unit and form part of the front structure, and half arch elements connected to the said arches formed at the top of the wire units and forming the rear of the arch spring structure.

12. A seat spring, having in combination a base frame, a front structure, helical springs spacing the front structure from the base frame, and a plurality of arches connecting the front structure to the base frame at the top and each arch made up of parts of arches which are hinged together.

In testimony whereof, I sign this specification.

LEONARD A. YOUNG.